UNITED STATES PATENT OFFICE.

JAMES D. BALDWIN, OF COLUMBUS, GEORGIA.

IMPROVEMENT IN COMPOSITIONS FOR PAINT-OIL.

Specification forming part of Letters Patent No. 25,712, dated October 11, 1859.

*To all whom it may concern:*

Be it known that I, J. D. BALDWIN, of Columbus, in the county of Muscogee and State of Georgia, have invented or discovered a new and useful Improvement in Paint-Oils, of which the following is a full, clear, and exact description of the several ingredients and their proportions making up my improved compound, and manner of preparing and using it.

It has long been a desiratum in house-painting, especially in southern or tropical climates, to find an oil for admixture with paint, and for oiling or coating painted work, that, while cheap for extensive outside use, would be durable, economize paint, produce a fine gloss, and be preservative of color against all atmospheric influence or the scorching rays of the sun. These are advantages my compound possesses, and it may be used for either in or out door work and wet or dry exposure.

The base of my compound is linseed-oil, the use and value of which in and to paint are well known. The ingredients I admix add greatly to the body and duration of such oil, and my compound, when mixed with, say, fifteen pounds of white lead, will cover as much surface as twenty or twenty-five pounds of white lead mixed in the ordinary linseed-oil, and the durability is increased at least one-third, while a saving in cost of one-fourth is or may be effected.

I take one gallon and three pints, say, of rain-water, two ounces of saleratus, which is allowed to dissolve, then add half a pound of gum-shellac, and boil all together in any suitable pot, without stirring, till all is dissolved or well mixed. I now add three quarts more rain-water, put the mixture in a tin vessel, and, taking four ounces of ground flaxseed and two ounces of slippery-elm bark in powder, tie these two latter ingredients in a machine-cloth and put them in the tin vessel, and allow the whole to remain for twelve hours, more or less. I then draw from the tin vessel one gallon of the composition, put it in a boiler or pot, and as soon as it begins to boil add one quart of linseed-oil, which will stop the boiling. Then increase the fire, and as the boiling-point is reached again add one gallon of linseed-oil more and stir and boil all together five minutes, after which take down the fire to prevent burning. When the whole has grown cold I take from the top one quart, which I call my "fine prepared oil No. 1," and which is well adapted for any kind of extra finish, or brilliant finish and fine gloss for inside work of any kind, or for making fine-gloss black paint without adding varnish, as in other mixtures, and serving to protect the paint more effectually against sun and weather than any boiled oil yet known. The finest portion of my prepared oil having been thus separated, nearly or about two gallons, it will be seen, remain of an inferior quality or commoner description, (No. 2.) This second quality and larger quantity answers well for all kinds of common outside or inside painting. To mix it properly with white lead or zinc, or other material for painting, it should be shaken so as to mix in the sediment with it. When used in white paint it looks a little dark at first, but dries out a beautiful and brilliant white, and is free from afterward turning yellow, as in ordinary oil-painting. When used for inside work this oil produces a gloss, and it adds to the life and duration of all painting. "Body" is so greatly increased that it adds materially to quantity when mixed with any kind of paint, or makes the paint "go farther."

Thus it will be seen this prepared paint-oil is of considerable value, is cheap, economizes paint, preserves color, gives a fine gloss, and is durable; also stands the hottest sun or worst weather, and it has cost me many years of study and experiment to bring it to its present perfection, suitable alike for in or out side work. Three coats of it produce a fine gloss, finest on outside painting. Painting done two years back, and only one coat, would have the appearance and firmness of painting done but three months ago.

I am aware that various watery solutions have been used for mixing paints, and that some of these have been applied in concert with oil; likewise, that many of the ingredients herein named have been differently employed in connection with paints. Such, therefore, separately considered, I do not claim; but I do claim—

As a new or improved article of manufacture, the paint-oil composed of the ingredients herein specified, essentially in the proportions named, and prepared, substantially as described, for use as herein set forth.

In testimony whereof I have hereunto subscribed my name.

JAMES D. BALDWIN.

Witnesses:
GRIGSBY E. THOMAS,
ARTHUR INGMIRE.